US012688283B2

(12) United States Patent
Zhang et al.

(10) Patent No.: US 12,688,283 B2
(45) Date of Patent: Jul. 21, 2026

(54) INFORMATION HANDLING SYSTEM (IHS) SELF-DESTRUCTION UPON UNAUTHORIZED IHS ACCESS

(71) Applicant: Dell Products, L.P., Round Rock, TX (US)

(72) Inventors: Yun Zhang, Shanghai (CN); Elie Antoun Jreij, Pflugerville, TX (US); Andrew Nepogodin, Round Rock, TX (US); Ching-Yun Chao, Austin, TX (US); Sisir Samanta, Round Rock, TX (US); Bridget Cate, Taylors, SC (US); Jason Davidson, Albany, OR (US); Susan E. Young, North Scituate, RI (US); Dominique Prunier, Montreal (CA); Maleravalappil Abdulla Mohammad Sadiq, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 378 days.

(21) Appl. No.: 18/341,123

(22) Filed: Jun. 26, 2023

(65) Prior Publication Data

US 2024/0427883 A1      Dec. 26, 2024

(51) Int. Cl.
*G06F 21/55* (2013.01)
*G06F 21/62* (2013.01)

(52) U.S. Cl.
CPC ........ *G06F 21/554* (2013.01); *G06F 21/6218* (2013.01)

(58) Field of Classification Search
CPC ........................... G06F 21/554; G06F 21/6218
See application file for complete search history.

(56) References Cited

U.S. PATENT DOCUMENTS

| | | | | |
|---|---|---|---|---|
| 5,736,777 A | * | 4/1998 | Shield ................... | H01L 23/576 |
| | | | | 438/467 |
| 9,245,155 B1 | * | 1/2016 | Melvin ................... | G06F 21/88 |
| 2007/0079146 A1 | * | 4/2007 | Hsu ...................... | G06F 21/6218 |
| | | | | 713/194 |
| 2013/0232543 A1 | * | 9/2013 | Cheng ..................... | H04L 63/20 |
| | | | | 726/1 |
| 2016/0055340 A1 | * | 2/2016 | Sand-Soll ............. | H04W 4/021 |
| | | | | 726/27 |
| 2018/0218751 A1 | * | 8/2018 | Clark ................... | B23K 26/127 |
| 2019/0149995 A1 | * | 5/2019 | Borghei ................ | H04W 12/12 |
| | | | | 455/411 |
| 2021/0209614 A1 | * | 7/2021 | Bakalis ................ | G06K 7/1417 |
| 2021/0342465 A1 | * | 11/2021 | Taylor ................... | G06F 21/602 |
| 2024/0281352 A1 | * | 8/2024 | Southgate ........... | H04L 63/1425 |

* cited by examiner

*Primary Examiner* — Blake I Narramore
(74) *Attorney, Agent, or Firm* — Fogarty LLP

(57) ABSTRACT

An IHS detects unauthorized access to the IHS, identifies one or more types of the unauthorized access to the IHS, determines a severity level of the unauthorized access to the IHS, based, at least in part, on an identified one or more types of the unauthorized access to the IHS, determines a type of self-destruction of the IHS, and destructs availability of the IHS, by the IHS in accordance with a determined type of self-destruction of the IHS. The IHS may send a notification that the IHS will self-destruct, and/or may collect evidence of the unauthorized access to the IHS prior to destructing availability of the IHS, by the IHS.

20 Claims, 4 Drawing Sheets

300

305

310

315

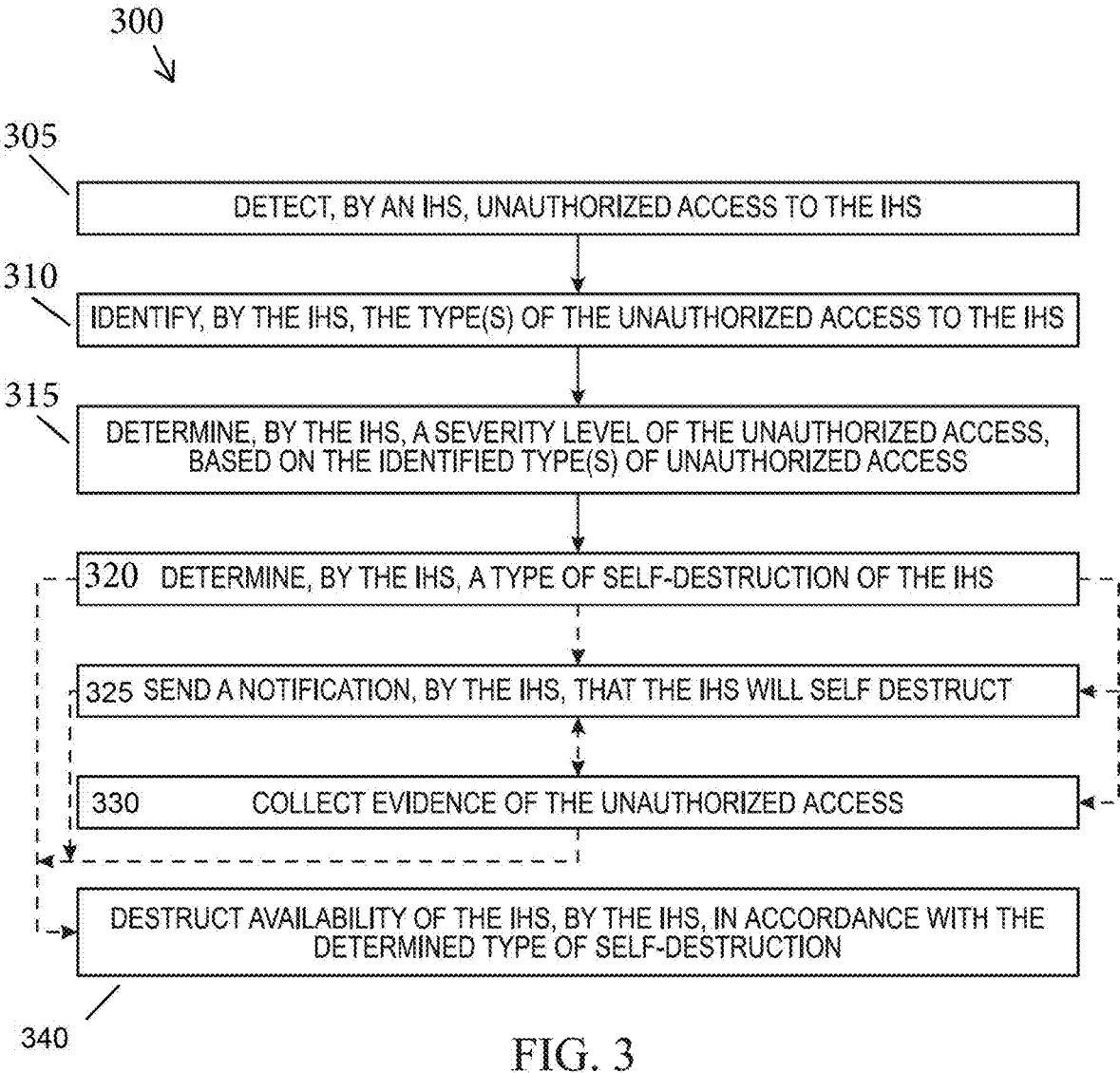

DETECT, BY AN IHS, UNAUTHORIZED ACCESS TO THE IHS

IDENTIFY, BY THE IHS, THE TYPE(S) OF THE UNAUTHORIZED ACCESS TO THE IHS

DETERMINE, BY THE IHS, A SEVERITY LEVEL OF THE UNAUTHORIZED ACCESS, BASED ON THE IDENTIFIED TYPE(S) OF UNAUTHORIZED ACCESS

320   DETERMINE, BY THE IHS, A TYPE OF SELF-DESTRUCTION OF THE IHS

325  SEND A NOTIFICATION, BY THE IHS, THAT THE IHS WILL SELF DESTRUCT

330          COLLECT EVIDENCE OF THE UNAUTHORIZED ACCESS

DESTRUCT AVAILABILITY OF THE IHS, BY THE IHS, IN ACCORDANCE WITH THE DETERMINED TYPE OF SELF-DESTRUCTION

INFORMATION HANDLING SYSTEM (IHS) SELF-DESTRUCTION UPON UNAUTHORIZED IHS ACCESS

FIELD

This disclosure relates generally to Information Handling Systems (IHSs), and, more specifically, to IHS (notification and) self-destruction, by the IHS, upon unauthorized access to the IHS.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems. Typically, unauthorized access to an IHS leads to leak of critical data or technology and/or even further breach to devices within the same trusted network etc.

SUMMARY

Embodiments of IHS (notification and) self-destruction, by the IHS, upon unauthorized access to the IHS are described. In an illustrative, non-limiting example an IHS detects unauthorized access to the IHS, identifies one or more types of the unauthorized access to the IHS, determines a severity level of the unauthorized access to the IHS, based, at least in part, on an identified one or more types of the unauthorized access to the IHS, determines a type of self-destruction of the IHS, and destructs availability of the IHS, by the IHS in accordance with a determined type of self-destruction of the IHS. The IHS may send a notification that the IHS will self-destruct, and/or may collect evidence of the unauthorized access to the IHS prior to destructing availability of the IHS, by the IHS.

The types of unauthorized access to the IHS may include unauthorized access to the IHS by an unauthorized person, unauthorized access to the IHS from an unauthorized location, unauthorized access to the IHS at an unauthorized time, and unauthorized access to the IHS via an unauthorized action. The unauthorized access to the IHS by the unauthorized person may include authentication failure, a plurality of authentication attempts to the IHS with insufficient permission, multi-factor authentication failure, concurrent logins to the IHS from different locations, and/or access to the IHS without a proper login. The unauthorized action may include unauthorized login to the IHS, unauthorized accessing of sensitive data on, or through the IHS, unauthorized power on of the IHS, unauthorized power off of the IHS, unauthorized reset of the IHS, physical movement of the IHS, and/or breach of a hardware chassis of the IHS.

The IHS may determine the severity level of the unauthorized access to the IHS by using a pre-defined severity policy to determine a final severity level of the unauthorized access to the IHS, based, at least in part, on an identified determined one or more types of the unauthorized access to the IHS. The pre-defined severity policy may include an algorithm, wherein each type of unauthorized access to the IHS has a pre-defined severity, and the IHS may, upon detection of unauthorized access to the IHS, use a max function to determine the final severity level of the unauthorized access to the IHS. Additionally, or alternatively, the pre-defined severity policy may include a decision tree, such as with multiple paths based on the identified types of unauthorized access to the IHS, and the IHS may consider a combination of identified types of the unauthorized access to the IHS, wherein the combination results in a higher severity than each of identified types of the unauthorized access to the IHS alone. Alternatively, the pre-defined severity policy may include both an algorithm and a decision tree, wherein each type of the unauthorized access to the IHS has a pre-defined severity, Therein, the IHS may consider a combination of identified types of the unauthorized access to the IHS, wherein the combination results in a higher severity than each of identified types of the unauthorized access to the IHS alone, and the IHS may use a max function to determine the final severity level of the unauthorized access to the IHS, based on the combination results.

The determined type of self-destruction of the IHS may include the IHS forcing itself to enter a locked mode, the IHS removing one or more licenses to an operating system, software and/or hardware of the IHS, the IHS deleting sensitive data on the IHS, one or more mechanisms to short circuit one or more of storage devices, integrated circuit chips and boards of the IHS and/or a destructive chemistry and/or fluid configured to destroy storage devices, integrated circuit chips and boards of the IHS.

In response to identifying a type of the of unauthorized access to the IHS as a compromise of hardware of the IHS, the IHS may implement a self-destruction safety prior to destructing availability of the IHS, to ensure destructing availability of the IHS will result in destructing availability of the IHS. The IHS may implement the self-destruction safety by: determining if a location of the IHS is unavailable for a pre-determined time, marking the location as not trusted, and start determining the severity level of the unauthorized access to the IHS, based at least in part on the location; determining if a location of the IHS has change dramatically within a pre-determined period of time, marking the location as not trusted, and start determining the severity level of the unauthorized access to the IHS, based at least in part on the location; periodically checking a synchronization of an unchangeable hardware-based timer of the IHS; implementing a battery, in the IHS for a hardware timer, one or more sensors, a location tracker, and/or an IHS camera, and a capacitor powering release of destructive chemistry and/or fluid to destroy storage devices, integrated circuit chips and boards of the IHS; employing a cellular network and/or satellite message functionality of the IHS to send a notification, by the IHS, that the IHS will self-destruct, prior to destructing availability of the IHS; and employ a hardware chassis breach sensor to identify the type of the unauthorized access as unauthorized access to the IHS via an unauthorized action.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 3 is a flowchart of an example process for IHS (notification and) self-destruction, by the IHS, upon unauthorized access to the IHS, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components. A more detailed example of an IHS, configured for IHS (notification and) self-destruction, by the IHS, upon unauthorized access to the IHS, is described with respect to FIG. 1.

Figure 1:
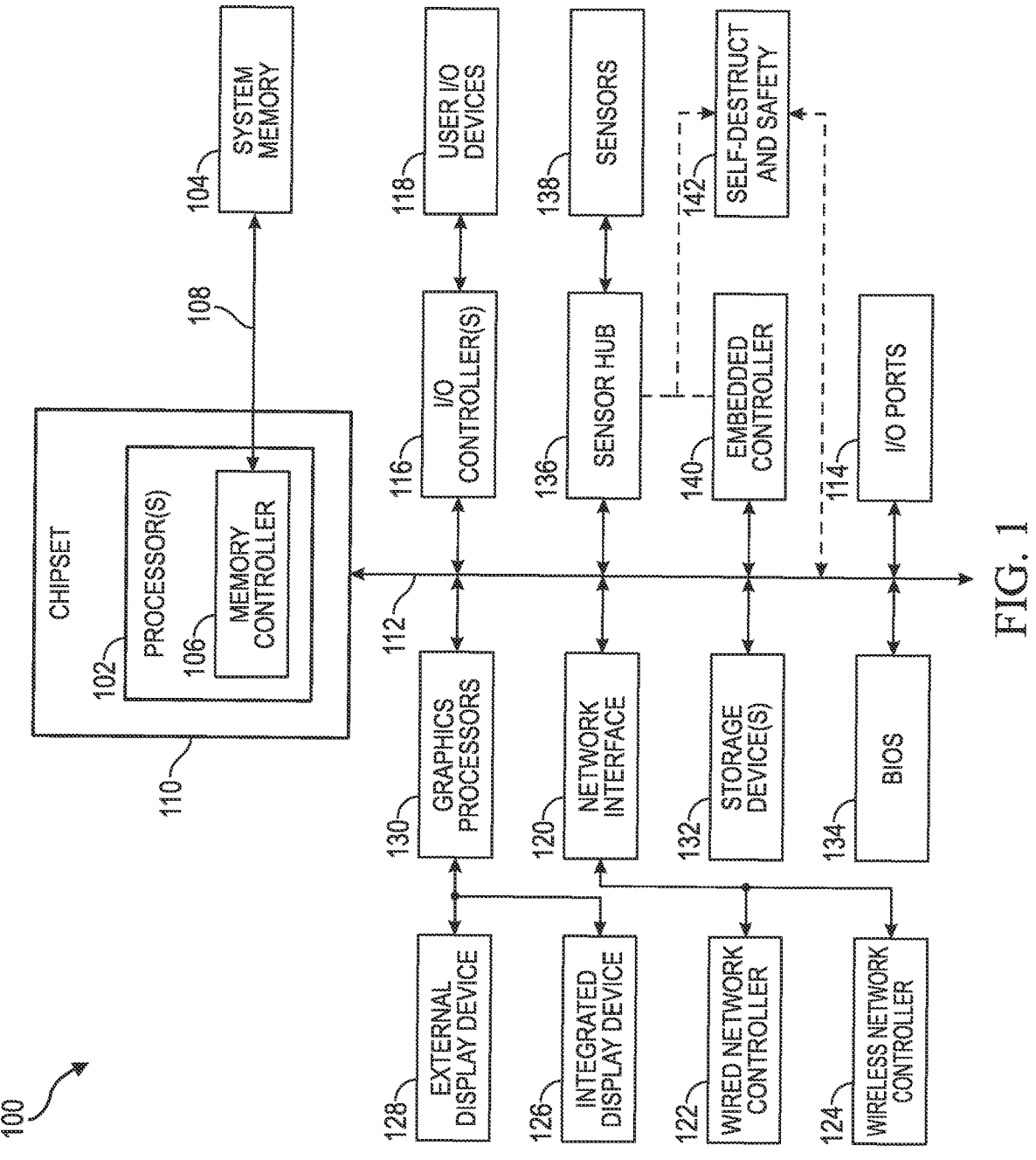
FIG. 1 is a block diagram illustrating components of an example of an Information Handling System (IHS) configured for IHS (notification and) self-destruction, by the IHS, upon unauthorized access to the IHS, according to some embodiments.

FIG. 1 is a block diagram of an example of internal components of IHS 100, according to some embodiments. As shown, IHS 100 includes one or more processors 102, such as a Central Processing Unit (CPU), that execute code retrieved from system memory 104. Although IHS 100 is illustrated with a single processor 102, other embodiments may include two or more processors, that may each be configured identically, or to provide specialized processing operations. Processor(s) 102 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 102 includes memory controller 106 that may be implemented directly within the circuitry of processor(s) 102, or memory controller 106 may be a separate integrated circuit that is located on the same die as processor(s) 102. Memory controller 106 may be configured to manage the transfer of data to and from the system memory 104 of IHS 100 via high-speed memory interface 108. System memory 104 coupled to processor(s) 102 provides processor(s) 102 with a high-speed memory that may be used in the execution of computer program instructions by processor(s) 102. Accordingly, system memory 104 may include memory components, such as static RAM (SRAM), dynamic RAM (DRAM), NAND Flash memory, suitable for supporting high-speed memory operations by processor(s) 102. In certain embodiments, system memory 104 may combine both persistent, non-volatile memory and volatile memory. In certain embodiments, system memory 104 may include multiple removable memory modules.

IHS 100 utilizes chipset 110 that may include one or more integrated circuits that are connected to processor(s) 102. In the embodiment of FIG. 1, processor(s) 102 is depicted as a component of chipset 110. In other embodiments, all of chipset 110, or portions of chipset 110 may be implemented directly within the integrated circuitry of processor(s) 102. Chipset 110 provides processor(s) 102 with access to a variety of resources accessible via bus 112. In IHS 100, bus 112 is illustrated as a single element. Various embodiments may utilize any number of separate buses to provide the illustrated pathways served by bus 112.

In various embodiments, IHS 100 may include one or more I/O ports 114 that may support removeable couplings with various types of external devices and systems, including removeable couplings with peripheral devices that may be configured for operation by a particular user of IHS 100. For instance, I/O ports 114 may include USB (Universal Serial Bus) ports, by which a variety of external devices may be coupled to IHS 100. In addition to or instead of USB ports, I/O ports 114 may include various types of physical I/O ports that are accessible to a user via the enclosure of IHS 100.

In certain embodiments, chipset 110 may additionally utilize one or more I/O controllers 116 that may each support the operation of hardware components such as user I/O devices 118 that may include peripheral components physically coupled to I/O port 114 and/or peripheral components that are wirelessly coupled to IHS 100 via network interface 120. In various implementations, I/O controller 116 may support the operation of one or more user I/O devices 118 such as a keyboard, mouse, touchpad, touchscreen, microphone, speakers, camera and other input and output devices that may be coupled to IHS 100. User I/O devices 118 may interface with an I/O controller 116 through wired or wireless couplings supported by IHS 100. In some cases, I/O controllers 116 may support configurable operation of supported peripheral devices, such as user I/O devices 118.

As illustrated, a variety of additional resources may be coupled to processor(s) 102 of IHS 100 through chipset 110. For instance, chipset 110 may be coupled to network interface 120 that may support different types of network connectivity. IHS 100 may also include one or more Network Interface Controllers (NICs) 122 and 124, each of which may implement the hardware required for communicating via a specific networking technology, such as BLUETOOTH, wireless local area network (e.g., Wi-Fi™), Ethernet, mobile cellular networks (e.g., CDMA, TDMA, 4G, LTE, 5G, SMS, etc.), satellite message functionality, etc.

Network interface 120 may support network connections by wired network controllers 122 and wireless network controllers 124. Each network controller 122 and 124 may be coupled via various buses to chipset 110 to support different types of network connectivity, such as the network connectivity utilized by IHS 100.

As illustrated, IHS 100 may support integrated display device 126, such as a display integrated into a terminal, laptop, tablet, 2-in-1 convertible device, or mobile device. IHS 100 may also support use of one or more external displays 128, such as external monitors that may be coupled to IHS 100 via various types of couplings, such as by connecting a cable from the external display 128 to external I/O port 128 of the IHS 100. One or more display devices 126 and/or 128 coupled to IHS 100 may utilize LCD, LED, OLED, or other display technologies. Each display device 126 and 128 may be capable of receiving touch inputs such as via a touch controller that may be an embedded component of display device 126 and/or 128 or graphics processor 130, or it may be a separate component of IHS 100 accessed via bus 112. In some cases, power to graphics processor 130, integrated display device 126 and/or external display 128 may be turned off or configured to operate at minimal power levels in response to IHS 100 entering a low-power state (e.g., standby). Chipset 110 may provide access to one or more display device(s) 126 and/or 128 via graphics processor 130. Graphics processor 130 may be included within a video card, graphics card or within an embedded controller installed within IHS 100. Additionally, or alternatively, graphics processor 130 may be integrated within processor(s) 102, such as a component of a system-on-chip (SoC). Graphics processor 130 may generate display information and provide the generated information to one or more display device(s) 126 and/or 128, coupled to IHS 100.

Chipset 110 also provides processor(s) 102 with access to one or more storage devices 132. In various embodiments, storage device 132 may be integral to IHS 100 or may be external to IHS 100. In certain embodiments, storage device 132 may be accessed via a storage controller that may be an integrated component of the storage device. Storage device 132 may be implemented using any memory technology allowing IHS 100 to store and retrieve data. For instance, storage device 132 may be a magnetic hard disk storage drive or a solid-state storage drive. In certain embodiments, storage device 132 may be a system of storage devices, such as a cloud system or enterprise data management system that is accessible via network interface 120.

As illustrated, IHS 100 also includes Basic Input/Output System (BIOS) 134 that may be stored in a non-volatile memory accessible by chipset 110 via bus 112. Upon powering or restarting IHS 100, processor(s) 102 may utilize BIOS 134 instructions to initialize and test hardware components coupled to the IHS 100. BIOS 134 instructions may also load an OS (e.g., WINDOWS, MACOS, IOS, ANDROID, LINUX, etc.) for use by IHS 100. BIOS 134 provides an abstraction layer that allows the operating system to interface with the hardware components of the IHS 100. The Unified Extensible Firmware Interface (UEFI) was designed as a successor to BIOS. As a result, many IHSs utilize UEFI in addition to or instead of a BIOS. As used herein, BIOS is intended to also encompass UEFI. IHS firmware (UEFI or BIOS), or the like, may enable a user to configure a "boot order." The IHS will try to boot from a first indicated device, and if this fails, the IHS will attempt to boot from the next indicated device, etc.

As illustrated, certain IHS 100 embodiments may utilize sensor hub 136 capable of sampling and/or collecting data from a variety of hardware sensors 138. Sensors may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, vibration sensors, chassis breach sensors, etc.). Generally, in various implementations, processor 102 may receive and/or produce context information using sensors 138 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System (GPS), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 102, GPU 130, system memory 104, etc.), an operating temperature of components of IHS 100, such as CPU temperature, memory module temperature, etc. In certain embodiments, sensor hub 136 may be an independent microcontroller or other logic unit that is coupled to the motherboard of IHS 100. Sensor hub 136 may be a component of an integrated system-on-chip incorporated into processor 102, and it may communicate with chipset 110 via a bus connection such as an Inter-Integrated Circuit (I2C) bus or other suitable type of bus connection. Sensor hub 136 may also utilize an I2C bus for communicating with various sensors supported by IHS 100.

As illustrated, IHS 100 may utilize embedded controller (EC) 140, which may be a motherboard component of IHS 100 and may include one or more logic units. In certain embodiments, EC 140 may operate from a separate power plane from the main processors 102 and thus the OS operations of IHS 100. Firmware instructions utilized by EC 140 may be used to operate a secure execution system that may include operations for providing various core functions of IHS 100, such as power management, management of operating modes in which IHS 100 may be physically configured and support for certain integrated I/O functions. In some embodiments, EC 140 and sensor hub 136 may communicate via an out-of-band signaling pathway or bus.

Embodiments of the present IHS (notification and) self-destruction, by the IHS, upon unauthorized access to the IHS May make include self-destruction and safety device(s) 142, shown as alternatively interconnected to bus 112, EC 140 and sensor hub 136. Self-destruction and safety device(s) 142 may include, by way of example, a mechanism to short circuit one or more of storage devices, integrated circuit chips and boards of the IHS, a destructive chemistry and/or fluid mechanism configured to destroy storage devices, integrated circuit chips and boards of the IHS, and/or the like, such as discussed below. Self-destruction and safety device(s) 142 may also include safety elements, such as, by way of example, a timer or a trusted time server (e.g., as listed at pool.ntp.org: the internet cluster of Network Time Protocol (NTP) servers (ntppool.org)), which may be interconnected to the GPS. Such a timer may be unchangeable and/or may be hardware-based. Also, a battery (e.g., for the hardware timer), a capacitor powering release of the destructive chemistry and/or fluid, and/or the like may be a part of Self-destruction and safety device(s) 142.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 102 as an SoC.

A person of ordinary skill in the art will appreciate that IHS 100 is merely illustrative and is not intended to limit the scope of the disclosure described herein. For example, IHS 100, although generally illustrated as a personal computer (e.g., desktop or laptop), may be a server (e.g., blade server or rack server), a network storage device, tablet computer, mobile device (e.g., personal digital assistant (PDA) or smart phone) or any other suitable device. A person of ordinary skill will recognize that IHS 100 of FIG. 1 is only one example of a system in which the certain embodiments may be utilized. Indeed, the embodiments described herein may be used in various electronic devices, such as network router devices, televisions, custom telecommunications equipment for special purpose use, etc. That is, certain techniques described herein are in no way limited to use with the IHS of FIG. 1. That is, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

As noted, unauthorized access to an IHS usually leads to leaking of critical data or technology. A user may desire to be notified about such unauthorized access, and under certain conditions it may be desirable for the IHS to carry out self-destruction, such as to prevent further loss, access, or the like. Embodiments disclosed herein are directed to IHS (notification and) self-destruction, by the IHS, upon unauthorized access to the IHS. To wit, embodiments detect unauthorized access of different types, then determines action such as send notification and/or self-destruct, according to the level of severity of the unauthorized access. To such ends, various embodiments employ multiple ways of unauthorized access detection, may use policy-based action determination engine(s), may have multiple pre-defined actions to notify user and prevent loss, may have multiple ways to safe the IHS itself from hardware intrusion an ability to use cloud-assisted or self-contained authentication frameworks, etc.

Figure 2:
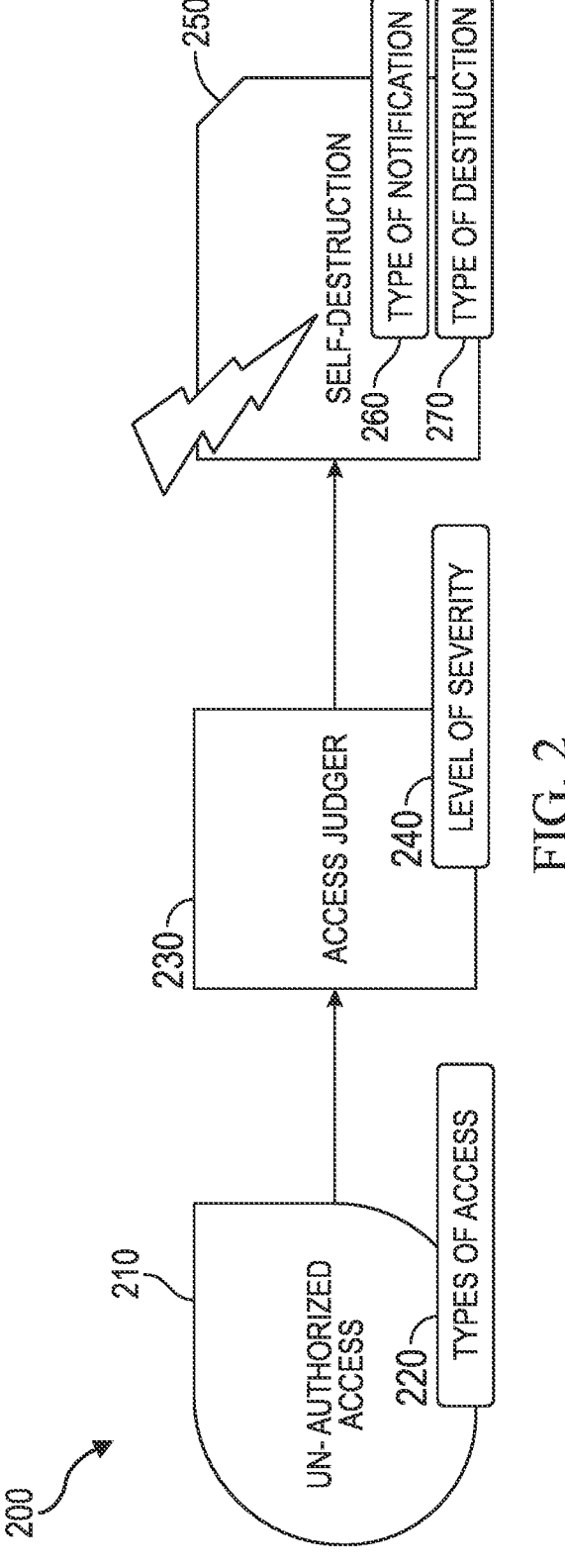
FIG. 2 is a diagram of IHS (notification and) self-destruction, by the IHS, upon unauthorized access to the IHS, according to some embodiments.

To wit, in accordance with some embodiments, and as described in greater detail below, an IHS may detect unauthorized access to the IHS, may identify one or more types of the unauthorized access to the IHS, may determine a severity level of the unauthorized access to the IHS, based, at least in part, on (an) identified type(s) of unauthorized access to the IHS, may determine a type of self-destruction of the IHS, and may destruct availability of the IHS, by the IHS in accordance with a determined type of self-destruction of the IHS. The IHS may send a notification that the IHS will self-destruct, and/or may collect evidence of the unauthorized access to the IHS prior to destructing availability of the IHS, by the IHS FIG. 2 is a high-level diagram of IHS (notification and) self-destruction 200, by the IHS, upon unauthorized access to the IHS, according to some embodiments. Therein, upon unauthorized access (210) being detected, by an IHS, (a) type(s) of the unauthorized access to the IHS are identified (220). Then an access judger (230), or the like, such as described in further detail below, determines a level of severity (240) of the unauthorized access to the IHS. Thereafter, the IHS, it may determine a type of notification to send (250) and sends it, and determines (260) a type of self-destruction, before self-destruction 270.

FIG. 3 is a flowchart of example process 300 for IHS (notification and) self-destruction, by the IHS, upon unauthorized access to the IHS, according to some embodiments. Therein, an IHS detects unauthorized access to the IHS, at 305. At 310, the IHS identifies one or more types of the unauthorized access to the IHS. These types of unauthorized access to the IHS may include, by way of example, unauthorized access to the IHS by an unauthorized person ("who"), unauthorized access to the IHS from an unauthorized location ("where"), unauthorized access to the IHS at an unauthorized time ("when"), unauthorized access to the IHS via an unauthorized action ("what"), and/or the like. Unauthorized access to the IHS by an unauthorized person, and/or evidence thereof, may include, by way of example, authentication failure, a plurality of authentication attempts to the IHS with insufficient permission, multi-factor authentication failure, concurrent logins to the IHS from different locations, access to the IHS without a proper login (i.e., hacking), etc. Unauthorized access to the IHS from an unauthorized location, and/or evidence thereof, may include, by way of example, access from a blocked location (e.g., in violation of a geo fence), or the like. Unauthorized access to the IHS at an unauthorized time, and/or evidence thereof, may, by way of example, include (attempted) access during a blocked period of time (e.g., during IHS setup, during IHS maintenance, or during an IHS locked mode), or the like). The unauthorized action, and/or evidence thereof, may include, by way of example, login to the IHS which would otherwise not be allowed, unauthorized accessing of sensitive or restricted data on or through the IHS, power on of the IHS which would otherwise not be allowed, power off of the IHS which would otherwise not be allowed, reset of the IHS which would otherwise not be allowed, physical movement of the IHS (e.g., a location change which would otherwise not be allowed, physical vibration etc.), breach (e.g., "unboxing") of a hardware chassis of the IHS, etc.

At 315, the IHS (judger 230) determines a severity level of the unauthorized access to the IHS. This determination may be based, at least in part, on the type(s) of the unauthorized access to the IHS identified at 310. This determination of the severity level of the unauthorized access to the IHS may be made using a pre-defined severity policy to determine a final severity level of the unauthorized access to the IHS, which may be based, at least in part, on the type(s) of the unauthorized access to the IHS identified at 310. Such a pre-defined severity policy may include (use of) an algorithm, wherein each type of the unauthorized access to the IHS has a pre-defined severity ("severity n"), wherein the IHS, upon detection of the unauthorized access to the IHS, uses a max function to determine the final severity level of the unauthorized access to the IHS.

$$f=\max(\text{severity}1,\text{severity}2,\text{severity}3 \ldots)$$

Figure 4:
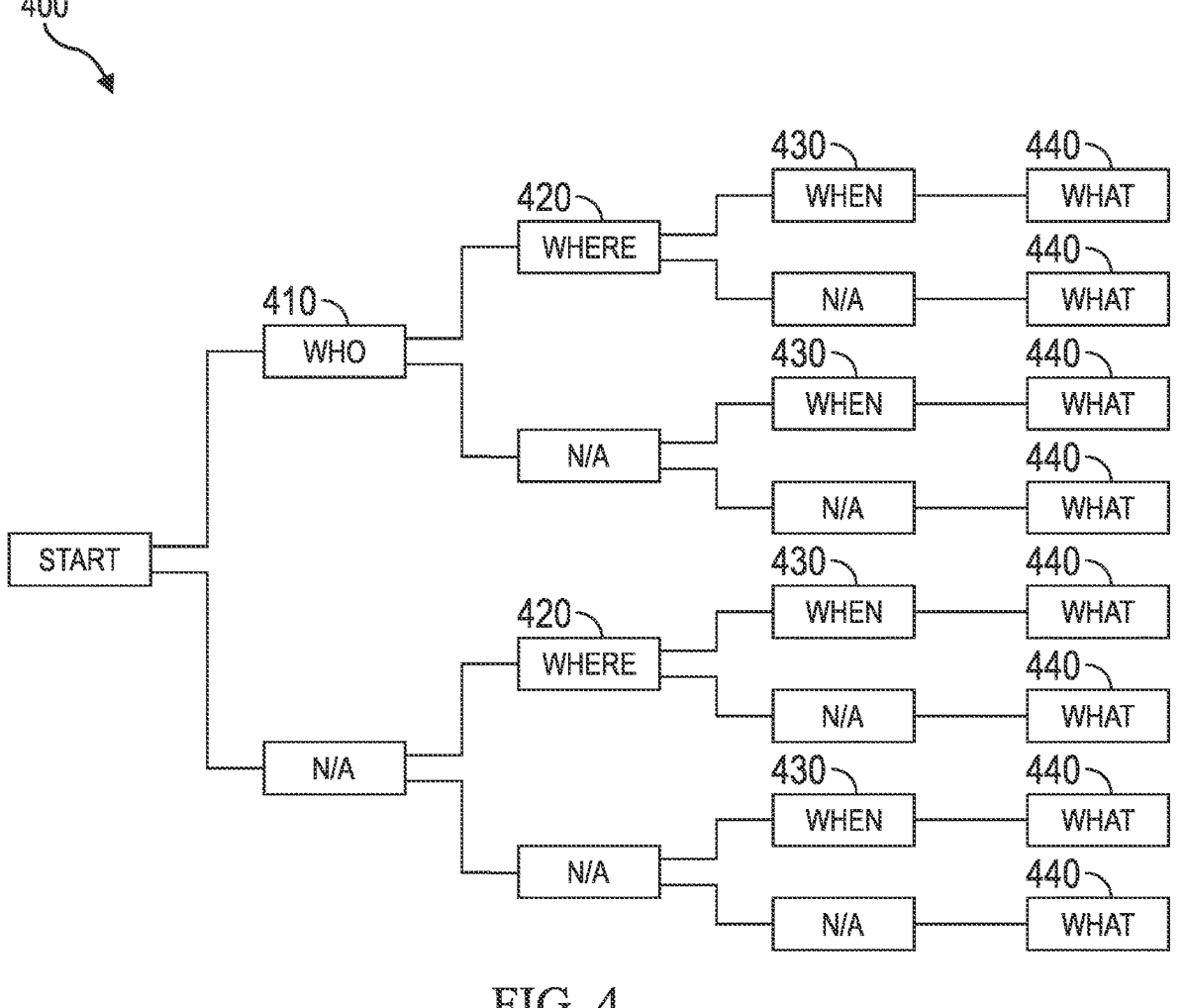
FIG. 4 is a diagram of a pre-defined severity policy decision tree for use in determining the severity level of unauthorized access to an IHS, according to some embodiments.

Alternatively, or additionally, as discussed below, the pre-defined severity policy may employ a decision tree that includes multiple paths, based on the identified types ("who," "where," "when," "what," etc.) of the unauthorized access. FIG. 4 is a diagram of pre-defined severity policy decision tree 400 for use in determining the severity level of unauthorized access to an IHS, based on the identified types ("who" 410, "where" 420, "when" 430, "what" 440), according to some embodiments. In accordance therewith, the IHS may consider a combination of identified types of the unauthorized access to the IHS, such that the combination results in a higher severity than each of identified types of the unauthorized access to the IHS alone, for example.

$$f=\text{path}(\text{who,where,when,what})$$

Alternatively, as noted, the pre-defined severity policy may employ both an algorithm and a decision tree. For example, each type of the unauthorized access to the IHS may have a pre-defined severity, and the IHS may consider a combination of identified types of the unauthorized access to the IHS, wherein, again, the combination results in a higher severity than each of identified types of the unauthorized access to the IHS alone, and then the IHS may use a max function to determine the final severity level of the unauthorized access to the IHS, such as, based on the combination results.

At 320, the IHS determines a type of self-destruction for the IHS to carry out at 325. This determination may be made between a number of different types of self-destruction, such as various methods of destructing availability of the IHS, or the like. In a one example type of self-destruction, the IHS may force itself to enter a locked mode, prevent booting, or the like, to destruct availability of the IHS at 325. In another example type of self-destruction, the IHS may remove one or more of its licenses to an operating system, software, hardware of the IHS, or the like to destruct availability of the IHS at 325. In a further example type of self-destruction, the IHS may delete sensitive data on the IHS, such as(s) private key(s) (e.g., encryption keys), (designated (sensitive or restricted) data, etc. to destruct availability of the IHS at 325. Other example types of self-destruction may include one or more mechanisms to short circuit (a) storage device(s), integrated circuit chips, boards (e.g., a motherboard, expansion boards, or the like) of the IHS, etc. (142). In such embodiments, the IHS may, therefore, short circuit one or more of storage devices, integrated circuits chips and boards of the IHS to destruct availability of the IHS at 325. In (a) further example(s), a destructive chemistry and/or fluid which would destroy (a) storage device(s), integrated circuit chips and boards of the IHS (142) may be deployed in the IHS, such that the IHS may release the destructive chemistry and/or fluid to destroy storage devices, integrated circuit chips and/or (the) board(s) of the IHS to destruct availability of the IHS at 325.

Additionally, a type of notification may be determined, and such notification that the IHS will self-destruct may be sent at 330, prior to destructing availability of the IHS at 325. Additionally, or alternatively, the IHS may collect evidence of the unauthorized access to the IHS, prior to destructing availability of the IHS at 325. This evidence may include (a) record(s) related who carried out the unauthorized access, where the unauthorized access was carried out from, when the unauthorized access was carried out, what manner of unauthorized access was carried out, and or the like. Such evidence may be captured using various available IHS devices, or the like, such as an IHS camera, IHS microphone, (a) (various) IHS sensor(s), other IHS hardware, IHS software, etc. (118). At 325, the IHS may self-destruct, destructing availability of the IHS, in accordance with a type of self-destruction determined at 320.

However, in various embodiments, in response to identifying a type of the of the unauthorized access to the IHS, at 310, as a compromise of hardware of the IHS, the IHS may implement a self-destruction safety, at 340, prior to, at least destructing availability of the IHS at 325, to ensure destructing availability of the IHS will result in destructing availability of the IHS at 325. For example, the IHS may implement the self-destruction safety at 340 by determining, such as by leveraging a timer assisted (142) location tracker, to determine if a location of the IHS is unavailable for a pre-determined time, marking the location as not trusted, and start determining the severity level of the unauthorized access to the IHS, at 315 based, at least in part on, that location. In another example, the IHS may implement the self-destruction safety at 340 by determining, such as by leveraging a timer assisted (142) location tracker to determine, if a location of the IHS has change dramatically within a pre-determined (very short) period of time, marking the location as not trusted, and start determining the severity level of the unauthorized access to the IHS, at 315, based at least in part on the location. In some examples, the IHS may implement the self-destruction safety at 340 by periodically checking a synchronization of an unchangeable hardware-based timer (142) of the IHS. In further examples, the IHS may include, or implement a battery (142), in the IHS for a hardware timer, one or more sensors, a location tracker, and/or an IHS camera, (118) and a capacitor (142) powering release of destructive chemistry and/or fluid (142) to destroy storage devices, integrated circuit chips and boards of the IHS, to implement the self-destruction safety at 340. In still further examples, the IHS may employ a cellular network (4G, 5G, SMS etc.) and/or satellite message functionality of the IHS (e.g., via wireless network controller 124) to send a notification, by the IHS, that the IHS will self-destruct, prior to destructing availability of the IHS at 325, to implement the self-destruction safety at 340. Additionally, or alternatively, the IHS may implement the self-destruction safety at 340 by employing a hardware (unbox) chassis breach sensor to identify the type of the unauthorized access as unauthorized access to the IHS via an unauthorized action.

Thereby, in accordance with the foregoing, embodiments of the present IHS (notification and) self-destruction, by the IHS, upon unauthorized access to the IHS detects unauthorized access of different types, then determine action, including sending a notification and/or self-destruction, according to the level of severity of the unauthorized access. As noted, this IHS (notification and) self-destruction, by the IHS, upon unauthorized access to the IHS may employ multiple ways of unauthorized access detection, may use policy-based action determination engine(s), may have multiple pre-defined actions to notify a user and prevent loss, may have multiple ways to safe the IHS itself from hardware intrusion, may have an ability to use cloud-assisted or self-contained authentication frameworks, etc.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

In various embodiments, aspects of systems and methods described herein may be implemented, at least in part, using machine learning (ML). For example, decision tree 400 may be based on ML training. In such embodiments, different data may be collected from different scenarios which indicate certain types of breach. The data could be from customer reports, customer escalations, industry-wise well known patterns, a company's security library and/or the like. The data may be used to train decision tree 400 so as, by way of example, to have different weights on each of the path nodes shown in FIG. 4, which eventually could be calculated into an aggregated value to indicate the severity. The resulting decision tree could be deployed to IHSs, via factory install, or in an (over-the-air) upgrade to keep the ML decision tree current.

As used herein, the terms "machine learning" or "ML" refer to one or more algorithms that implement: a neural network (e.g., artificial neural network, deep neural network, convolutional neural network, recurrent neural network, autoencoders, reinforcement learning, etc.), fuzzy logic, artificial intelligence (AI), deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available machine learning algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.Ish, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN."

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS) configured to comprise:
   a processor; and
   a memory coupled to the processor, wherein the memory comprises program instructions stored thereon that, upon execution by the processor, cause the IHS to perform operations that comprise:
      detect unauthorized access to the IHS, based, at least in part, upon a blocked period of time in an IHS setup, maintenance, or locked mode, and a hardware chassis breach sensor;
      identify one or more types of the unauthorized access to the IHS;
      determine a severity level of the unauthorized access to the IHS, based, at least in part, on an identified one or more types of the unauthorized access to the IHS, wherein determination of the severity level comprises application of a machine learning trained decision tree configured with weights on each of a plurality of path nodes that are calculated into an aggregated value determined to indicate the severity level, and wherein the machine learning trained decision tree is deployed to IHSs via factory install or an over-the-air upgrade to keep the machine learning trained decision tree current;
      determine a type of self-destruction of the IHS; and
      destruct availability of the IHS, by the IHS in accordance with a determined type of self-destruction of the IHS.

2. The IHS of claim 1, wherein, upon execution by the processor, the program instructions further cause the IHS to send a notification that the IHS will self-destruct, prior to destruction of availability of the IHS.

3. The IHS of claim 1, wherein, upon execution by the processor, the program instructions further cause the IHS to collect evidence of the unauthorized access to the IHS prior to destruction of availability of the IHS, by the IHS.

4. The IHS of claim 1, wherein the one or more types of the unauthorized access to the IHS comprise:
   unauthorized access to the IHS by an unauthorized person;
   unauthorized access to the IHS from an unauthorized location;
   unauthorized access to the IHS at an unauthorized time; and
   unauthorized access to the IHS via an unauthorized action.

5. The IHS of claim 4, wherein the unauthorized access to the IHS by the unauthorized person comprises at least one of:
   authentication failure;
   a plurality of authentication attempts to the IHS with insufficient permission;
   multi-factor authentication failure;
   concurrent logins to the IHS from different locations; and
   access to the IHS without a proper login.

6. The IHS of claim 4, wherein the one or more types of the unauthorized access further comprise at least one of:
   unauthorized login to the IHS;
   unauthorized access of sensitive data on, or through the IHS;
   unauthorized power on of the IHS;
   unauthorized power off of the IHS;
   unauthorized reset of the IHS;
   physical movement of the IHS; and
   breach of a hardware chassis of the IHS.

7. The IHS of claim 1, wherein, upon execution by the processor, the program instructions further cause the IHS to determine the severity level of the unauthorized access to the IHS based, at least in part, on a pre-defined severity policy to determine a final severity level of the unauthorized access to the IHS, based, at least in part, on an identified determined one or more types of the unauthorized access to the IHS.

8. The IHS of claim 7, wherein, the pre-defined severity policy comprises an algorithm, wherein each type of the unauthorized access to the IHS has a pre-defined severity, and, upon execution by the processor, the program instructions further cause the IHS to, upon detection of unauthorized access to the IHS, use a max function to determine the final severity level of the unauthorized access to the IHS.

9. The IHS of claim 8, wherein the pre-defined severity policy comprises the machine learning trained decision tree, and wherein, upon execution by the processor, the program instructions further cause the IHS to consider a combination of identified types of the unauthorized access to the IHS, wherein the combination results in a higher severity than each of identified types of the unauthorized access to the IHS alone.

10. The IHS of claim 9, wherein the machine learning trained decision tree further comprises multiple paths, based on the identified types of the unauthorized access to the IHS.

11. The IHS of claim 8, wherein:
   the pre-defined severity policy comprises the algorithm and the machine learning trained decision tree;
   each type of the unauthorized access to the IHS has a pre-defined severity; and upon execution by the processor, the program instructions further cause the IHS to:
      consider a combination of identified types of the unauthorized access to the IHS, wherein the combination results in a higher severity than each of identified types of the unauthorized access to the IHS alone; and
      use a max function to determine the final severity level of the unauthorized access to the IHS, based on the combination.

12. The IHS of claim 1, wherein the determined type of self-destruction of the IHS comprises at least one of:

force the IHS to enter a locked mode;

remove one or more licenses to an operating system, software and/or hardware of the IHS;

delete sensitive data on the IHS;

activate one or more mechanisms to short circuit one or more storage devices, integrated circuit chips and boards of the IHS; and release a destructive chemistry and/or fluid configured to destroy storage devices, integrated circuit chips and boards of the IHS.

13. The IHS of claim 1, wherein, upon execution by the processor, the program instructions further cause the IHS to, in response to identification of a type of the unauthorized access to the IHS as a compromise of hardware of the IHS, implement a self-destruction safety prior to destruction of availability of the IHS, to ensure destruction of availability of the IHS.

14. The IHS of claim 13, wherein to implement the self-destruction safety comprises at least one of: determine if a location of the IHS is unavailable for a pre-determined period of time, mark the location as not trusted, and start determination of the severity level of the unauthorized access to the IHS, based, at least in part, on the location; determine if the location of the IHS has changed within the pre-determined period of time, mark the location as not trusted, and start determination of the severity level of the unauthorized access to the IHS, based, at least in part, on the location; periodically check a synchronization of an unchangeable hardware-based timer of the IHS; release destructive chemistry and/or fluid to destroy storage devices, integrated circuit chips and boards of the IHS; employ a cellular network and/or satellite message functionality of the IHS to send a notification, by the IHS, that the IHS will self-destruct, prior to destruction of availability of the IHS; and employ the hardware chassis breach sensor to identify the type of the unauthorized access as unauthorized access to the IHS via an unauthorized action.

15. A method comprising:

detecting, by an Information handling System (IHS), unauthorized access to the IHS, based, at least in part, upon a blocked period of time during an IHS setup, maintenance, or locked mode, and a hardware chassis breach sensor;

identifying, by the IHS, one or more types of the unauthorized access to the IHS;

determining, by the IHS, a severity level of the unauthorized access to the IHS, based, at least in part, on an identified determined one or more types of the unauthorized access to the IHS, wherein determining the severity level comprises applying a machine learning trained decision tree having weights on each of a plurality of path nodes that are calculated into an aggregated value determined to indicate the severity level, and wherein the machine learning trained decision tree is deployed to IHSs via factory install or an over-the-air upgrade to keep the machine learning trained decision tree current;

determining, by the IHS, a type of self-destruction of the IHS; and destructing availability of the IHS, by the IHS in accordance with a determined type of self-destruction of the IHS.

16. The method of claim 15, further comprising at least one of:

collecting evidence of the unauthorized access to the IHS prior to destructing availability of the IHS, by the IHS; and sending a notification, by the IHS, that the IHS will self-destruct, prior to destructing availability of the IHS, by the IHS.

17. The method of claim 15, wherein the one or more types of the unauthorized access to the IHS comprise:

unauthorized access to the IHS by an unauthorized person;

unauthorized access to the IHS from an unauthorized location;

unauthorized access to the IHS at an unauthorized time; and unauthorized access to the IHS via an unauthorized action.

18. The method of claim 15, wherein determining the severity level of the unauthorized access comprises using an algorithm and/or the machine learning trained decision tree, wherein each type of the unauthorized access to the IHS has a pre-defined severity and the method further comprises:

considering a combination of identified types of the unauthorized access to the IHS, wherein the combination results in a higher severity than each of identified types of the unauthorized access to the IHS alone; and/or using a max function to determine a final severity level of the unauthorized access to the IHS.

19. The method of claim 15, further comprising, in response to identifying a type of the unauthorized access to the IHS as a compromise of hardware of the IHS, implementing a self-destruction safety prior to destructing availability of the IHS, to ensure destructing availability of the IHS.

20. A non-transitory computer-readable storage media configured to store program instructions, that when executed on or across one or more processors of an Information Handling System (IHS), cause the IHS to perform operations that comprise:

detect unauthorized access to the IHS, based, at least in part, upon sensor information captured by an embedded controller (EC) configured to operate from a power plane separate from any IHS host processor, in a blocked period of time in an IHS setup, maintenance, or locked mode, wherein the sensor information comprises information from a hardware chassis breach sensor coupled to the EC via an out-of-band signal pathway;

identify one or more types of the unauthorized access to the IHS;

determine a severity level of the unauthorized access to the IHS, based, at least in part, on an identified one or more types of the unauthorized access to the IHS, wherein determination of the severity level comprises application of a machine learning trained decision tree configured with weights on each of a plurality of path nodes that are calculated into an aggregated value determined to indicate the severity level, and wherein the machine learning trained decision tree is deployed to IHSs via factory install or an over-the-air upgrade to keep the machine learning trained decision tree current;

determine a type of self-destruction of the IHS; and at least one of:

in response to identification of a type of the unauthorized access to the IHS as a compromise of hardware of the IHS, implement a self-destruction safety to ensure destruction of availability of the IHS;

collect evidence of the unauthorized access to the IHS;

send a notification that the IHS will self-destruct; and destruct availability of the IHS, by the IHS in accordance with a determined type of self-destruction of the IHS.

* * * * *